United States Patent [19]

Mowdood et al.

[11] Patent Number: 4,857,397

[45] Date of Patent: Aug. 15, 1989

[54] TIRE COATING COMPOSITION AND USE FOR CURING TIRES

[75] Inventors: Syed K. Mowdood, Akron; Bharat K. Kansupada, Mogadore, both of Ohio

[73] Assignee: The Goodyear Tire & Rubber Company, Akron, Ohio

[21] Appl. No.: 179,351

[22] Filed: Apr. 8, 1988

[51] Int. Cl.$^4$ .................... B29D 30/08; B32B 25/04; B32B 25/16

[52] U.S. Cl. .................................. 428/323; 264/501; 428/324; 428/327; 428/516; 428/517; 428/519; 524/449; 524/451; 524/496

[58] Field of Search ............... 428/332, 352, 515, 517, 428/516, 519, 338, 339, 323, 324, 327, 521; 264/501; 524/496, 449, 451; 152/537

[56] References Cited

U.S. PATENT DOCUMENTS 4,072,645  2/1978  Cogley, Jr. .................... 524/575
4,329,265  5/1982  Hallenbeck .................... 524/496

*Primary Examiner*—Alan M. Lieberman
*Attorney, Agent, or Firm*—Henry C. Young, Jr.

[57] ABSTRACT

Tire coating composition (non-wax) composed of a rubber selected from polybutadiene and/or styrene/butadiene copolymer, carbon black having a large particle size and, preferably, a non-ionic surfactant and use thereof for curing tires. Optionally, the composition can also contain at least one of mica and talc.

18 Claims, No Drawings

TIRE COATING COMPOSITION AND USE FOR CURING TIRES

FIELD OF THE INVENTION

This invention relates to a non-wax coating composition and use thereof for coating unvulcanized rubber and particularly for curing tires.

BACKGROUND

Conventionally, pneumatic rubber tires are produced by molding and curing a green, or uncured, tire in a molding press in which the green tire is pressed outwardly against a mold surface by means of an inner fluid expandable bladder. By this method, the green tire is shaped against the outer mold surface which typically defines the tire's tread pattern and configuration of sidewalls. By application of heat, the tire is cured. Generally, the bladder is expanded by internal pressure provided by a fluid such as hot gas, hot water and/or steam which also participates in the transfer of heat for curing or vulcanization purposes. The tire is then usually allowed to cool somewhat in the mold, sometimes aided by added cold or cooler water to the internal surface of the bladder. Then the mold is opened, the bladder collapsed by removal of its internal fluid pressure and the tire removed from the tire mold. Such tire curing procedure is well known to those having skill in such art.

It is recognized that rubbery polymers sometimes have a tendency to stick or adhere somewhat to vulcanization or curing mold surfaces and can, therefor, be somewhat difficult to remove from the mold surface after the vulcanization procedure in the mold is completed. Sometimes the mold surface itself is treated with a release agent to reduce the sticking tendency, if present and sometimes the outer unvulcanized rubber itself (such as, for example, the sidewall and tread area of an unvulcanized tire) is coated with a coating of a release composition sometimes referred to as a precure paint, precure coating, or a precure cement. Alternatively, by more accurately designing or building the components of the tire and by more definitely designing the tire mold itself, often a precure paint and/or mold release agent is not needed. However, for some tire manufacturing purposes a tire precure coating on its outer surface is still considered desirable.

Thus, a precure coating, if used, is appropriately applied to the outside surface of unvulcanized rubbery product such as a tire prior to its molding and curing. A preferred precure coating is one which will not remain, even in part, on the surface of the mold when the rubbery product is released from the mold after vulcanization. Such mold buildup of the precure coating on the mold surface can be undesirable since it can require a periodic cleaning of the mold. An ideal precure coating should allow the portion of the rubbery product in proximity to the surface of the mold to flow without restriction and without the formation of surface defects such as cracks, air bubbles or voids in the surface of the rubber during the vulcanization step so as to result in a smooth surface. It is also desirable that the precure coating itself forms a smooth coating on the rubber product. This provides the product with a presentable appearance also may help to prevent subsequent cracking of the rubber product due to oxygen and/or ozone attack.

Various coatings have been used in the past. These include, for example, soapstone and silicone based coatings. Silicone based coating materials have been used to coat the mold or the surface of the unvulcanized rubber. The use of silicone has often been considered an improvement over the use of soapstone in that the mold release properties are usually improved.

Precure cements based on ethylene/propylene/diene terpolymer rubber (EPDM) plus another polymer (such as natural rubber and synthetic rubber) together with a curative have been used (U.S. Pat. No. 3,595,950).

Various other precure cements, or paints have been described as being useful for coating the outside surface of a tire prior to its molding and curing. For example, U.S. Pat. No. 4,329,265 describes such a paint which is water based and is comprised of a rubber latex, a wax dispersion, carbon black, water and a surfactant. While the patent remarks that various rubber latices can be used, only natural rubber or SBR latex is generally stated as being preferred and natural rubber exemplified. The paint uses a relatively large size of carbon black and a size greater than 50 millimicrons is preferred. The paint utilizes, as a necessary ingredient a wax dispersion as a means of providing slip. As it will be seen, the instant invention differs therefrom, at least in one important aspect, by specifically requiring a polybutadiene latex and, further, does not utilize a wax dispersion as a slip material.

DISCLOSURE AND PRACTICE OF INVENTION

In accordance with this invention, a non-wax containing coating composition is provided which comprises:

(A) 100 parts by weight of at least one rubber selected from polybutadiene rubber and butadiene/styrene copolymer rubber, (B) about 300 to about 1000, preferably about 500 to about 1000, parts by weight carbon black characterized by having a particle size in the range of about 50 to about 110 nanometers (nm) wherein the weight ratio of carbon black to the said rubber is in the range of about 3/1 to about 10/1, preferably about 3.5/1 to about 6/1.

Although optional, the coating composition can also contain at least one additional material selected from mica, talc, and a non-ionic surfactant.

When used, about 2 to about 10 parts by weight mica is preferred.

When used about 10 to about 100 parts by weight talc is preferred.

When used, about 1 to about 30 parts by weight of a non-ionic surfactant is used although the amount is generally not critical. Usually, it is preferred that the surfactant is used in the composition.

The polybutadiene rubber is preferred because better air bleed in the curing environment was observed.

The composition for application to the green tire is an aqueous emulsion or dispersion, of the materials. On this basis, the polybutadiene is added to the composition as an emulsion thereof and the carbon black can be added as an emulsion or dispersion thereof. Such emulsions and/or dispersions will contain their own emulsifiers such as for example anionic emulsifiers which might be alkyl or alkylaryl sulfonates.

The water in the aqueous-based composition can be found in the polybutadiene latex and carbon black dispersion and, if desired, by adding water. Thus, if desired, the carbon black can be added in the form of an aqueous dispersion therefor and is thus also a source of water.

The amount of water can be varied to give a composition of a desired solids content. The composition after application to the unvulcanized rubber, is dried by evaporation. Certainly more water could be used, although additional dilution of the composition should reduce the efficiency of its application and increase drying time.

In further accordance with this invention, an unvulcanized pneumatic tire having such a coating composition on its outer surface (particularly after water removal) is provided. In practice, the rubber for the tire is typically natural rubber or a blend of two or more of natural rubber and synthetic rubber such as, for example, polyisoprene, polybutadiene, SBR and EPDM.

In still further practice of this invention, a method of preparing a pneumatic or semi-pneumatic rubber tire is provided in which the tread and/or sidewall surface of a green tire is coated with the precure coating composition of this invention and placed in a tire mold, the mold closed and the internally positioned bladder expanded by application of internal hot fluid pressure to force the tire outward against the mold surface to shape and cure the tire followed by opening the mold, collapsing the bladder and removing the shaped and cured tire. The bladder is generally connected to an internal part of the tire mold itself.

In more detail, for example, such a method of molding a pneumatic or semi-pneumatic tire which comprises the steps of:

(A) providing or building a green tire with elements which are to be its outer tread for ground-contacting purposes, two spaced inextensible beads, sidewalls extending radially outwardly from said beads to join said tread, supporting carcass with reinforcing elements, and an inner surface of rubber gum stock:

(B) coating the sidewall and/or tread portion(s) of the green tire with the said precure coating as an aqueous dispersion thereof:

(C) drying the said precure coating to substantially remove the water therefrom:

(D) inserting said coated green tire into a tire mold press and positioning a tire cure bladder inside of said green tire, said bladder being attached to an internal portion of said tire press:

(E) closing the tire mold and expanding said coated tire cure bladder by internal, heated fluid outwardly against the inner gum stock surface of said tire to press the tire outward under conditions of heat and pressure to shape and cure said tire:

(F) opening the tire mold, collapsing said bladder and removing the cured tire having a generally toroidal shape therefrom.

The term "pneumatic tire" relates to tires which rely on an internal fluid, such as air under pressure in their tire cavity for their proper operation when mounted on a rim and the term "semi-pneumatic" tire relates to tires which contain an internal fluid, such as air, in their cavity but do not totally rely on its pressure for its proper operation when mounted on a rim.

In the practice of this invention, the aqueous emulsion or dispersion of the lubricant (precure) composition can conveniently be prepared by the method which comprises, mixing the following ingredients, to the extent the optional materials are used:

Sequentially, for example, adding to water a chelating agent, defoamer, bactericide, carbon black dispersion non-ionic surfactant, mica and talc, if used. Then the polybutadiene latex can be added in this sequence. Generally the specific sequence is not critical.

It is surely appreciated that various relatively well known defoaming agents various stabilizers and various biocides can be used in the practice of this invention which are generally well known to those having skill in the pertaining art. The optional defoamer can be of a non-silicone hydrocarbon oil which is beneficial because it prevents or inhibits foam formation during mixing.

The aqueous dispersion is simply coated, such as by spray coating, onto the rubber (tire) surface and dried by evaporation at a temperature, for example, at room temperature.

It is important to appreciate that the weight ratio of carbon black to polybutadiene rubber and/or SBR if used is at least 3/1. Apparently, although it may not be entirely understood, the large amount and ratio of large particle sized carbon black, particularly when combined with the included non-ionic surfactant, has an effect of eliminating or substantially reducing the surface tack of the uncured tire and enhances air bleed during the curing process. The polybutadiene rubber apparently acts as a binder for the large particle size carbon black as well as other pigments such as, for example mica and talc, if used.

While the amount of the non-ionic surfactant is not critical, enough is added so that adequate wetting of the uncured tire surface is obtained together with an enhancement of the stability of the aqueous coating mixture. Those having skill in such art will understand such requirement.

Mica and talc can be added or used, for their known air bleed and lubricity-enhancing properties, if desired. Clay can also be added, if desired - such as for example, bentonite clay for its thickening properties, although it is not usually considered necessary.

The practice of this invention is further illustrated by reference to the following example which is intended to be representative rather than restrictive of the scope of the invention. Unless otherwise indicated, all parts and percentages are by the weight.

EXAMPLE I

A tire precure coating composition was prepared according to the following recipe shown in Table 1.

TABLE 1

| Material | Parts (Rounded) | | | |
|---|---|---|---|---|
| | Cpsn A | Cpsn B | Cpsn C | Cpsn D |
| Polybutadiene Latex[1] (47% polybutadiene) | 214 | 214 | 214 | 214 |
| Carbon Black[2] aqueous dispersion (42% solids) | 983 | — | — | — |
| Carbon Black[3] aqueous dispersion (52% solids) | — | 825 | 1205 | 825 |
| Mica | 18 | 18 | — | — |
| Talc | 180 | 180 | — | — |
| Chelating Agent[4] | 0.9 | 0.8 | 0.8 | 0.8 |
| Defoamer[5] | 0.9 | 0.8 | 0.8 | 0.8 |
| Bactericide[6] | 0.1 | 0.1 | 0.1 | 0.1 |
| Nonionic Surfactant[7] | 15 | 16 | 16 | 16 |
| Nonionic surfactant[8] | 15 | 16 | 16 | 16 |

TABLE 1-continued

| Material | Parts (Rounded) | | | |
|---|---|---|---|---|
| | Cpsn A | Cpsn B | Cpsn C | Cpsn D |
| Water | 13 | 221 | 38 | 53 |

[1] A polybutadiene latex obtained as LPM 2374P from The Goodyear Tire & Rubber Company.
[2] Obtained as Aquablak M from the Borden Chemicals company having a carbon black particle size of about 62 nanometers (nm).
[3] Obtained as Aquablak 597-153 from the Borden Chemicals Company having a carbon black particle size of about 96 nm.
[4] A sodium salt of ethylene diamine triacetic acid obtained as Versene 100, a product of Dow Chemical Company.
[5] Reportedly a petroleum hydrocarbon oil obtained as Tacfoam VCPAC, a product of The Versa Chemicals company.
[6] A 6-acetoxy-2,4-dimethyl-1,3-dioxane obtained as GIV GARD DXN, a product of The Givaudan company.
[7] Reportedly an alcohol alkoxylate obtained as Witconol 1207, a product of The Witco Chemicals company.
[8] Obtained as Min-Foam 2X, a product of the Union Carbide company.

The aqueous emulsion dispersion was prepared according to the procedure hereinbefore described.

The mixtures (Compositions A, B, C and D) were spray coated onto the outer surfaces of the tread portion of, and sometimes also the sidewall of the unvulcanized (green) rubber radial and bias ply tires.

The coating was dried for about 3 to 15 minutes (at about 25° C.) on the tire surface to form a (precure) coating composition thereon.

The coated tires were placed in a tire mold press and a cure bladder, attached to the mold, inserted inside the tire. The mold was closed and the bladder was expanded by steam at a curing temperature to force it against the inside surface of the tire and press the tire outwardly against the outer mold surface so that the tire was shaped as desired and cured.

The mold was then opened, the bladder collapsed and the tire was successfully removed therefrom without attendant defects indicating satisfactory air bleed and mold release.

The applied precure coating of this invention apparently cures to the tire during the tire's vulcanization process in the mold, apparently through autogeneously curing by the free vulcanization agents such as, for example, free sulfur contained in the rubber composition of the tire surface so that it did not coat out onto the mold surface itself. Thus, a satisfactory precure coating has been developed which is non-wax and does not need the presence of a silicone and is organic solvent free.

While certain representative embodiments and details have been shown for the purpose of illustrating the invention, it will be apparent to those skilled in this art that various changes and modifications may be made therein without departing from the spirit or scope of the invention.

What is claimed is:

1. An uncured rubber tire having on its outer surface a coating composition which comprises
   (a) 100 parts by weight of at least one rubber selected from polybutadiene rubber and styrene/butadiene copolymer rubber;
   (b) about 300 to about 1000 parts by weight of carbon black characterized by having a particle size in the range of about 50 to about 100 nanometers (nm).

2. The tire of claim 1 wherein said composition contains in the range of about 1 to about 30 parts by weight of a non-ionic surfactant.

3. The tire of claim 1 wherein said composition contains at least one of mica and talc.

4. The tire of claim 1 where the rubber of said coating composition is polybutadiene.

5. The tire of claim 2 where the rubber of said composition comprises polybutadiene.

6. The tire of claim 2 wherein said composition contains at least one of mica and talc.

7. The tire of claim 6 where the rubber of said composition comprises polybutadiene.

8. The tire of claim 3 where the rubber of said coating composition comprises polybutadiene.

9. The tire of claim 1 where said coating contains about 500 to about 1000 parts by weight of said carbon black.

10. The vulcanized tire of claim 3 where said coating is autogeneously cured to at least one rubber surface of the tire during vulcanization.

11. The vulcanized tire of claim 2 where said coating is autogeneously cured to at least one rubber surface of the tire during vulcanization.

12. The vulcanized tire of claim 3 where said coating is autogeneously cured to at least one rubber surface of the tire during vulcanization.

13. The vulcanized tire of claim 4 where said coating is autogeneously cured to at least one rubber surface of the tire during vulcanization.

14. The vulcanized tire of claim 5 where said coating is autogeneously cured to at least one rubber surface of the tire during vulcanization.

15. The vulcanized tire of claim 6 where the coating is autogeneously cured to at least one rubber surface of the tire during vulcanization.

16. The vulcanized tire of claim 7 where said coating is autogeneously cured to at least one rubber surface of the tire during vulcanization.

17. The vulcanized tire of claim 8 where said coating is autogeneously cured to at least one rubber surface of the tire during vulcanization.

18. The vulcanized tire of claim 9 where said coating is autogeneously cured to at least one rubber surface of the tire during vulcanization.

* * * * *